Figure 1:
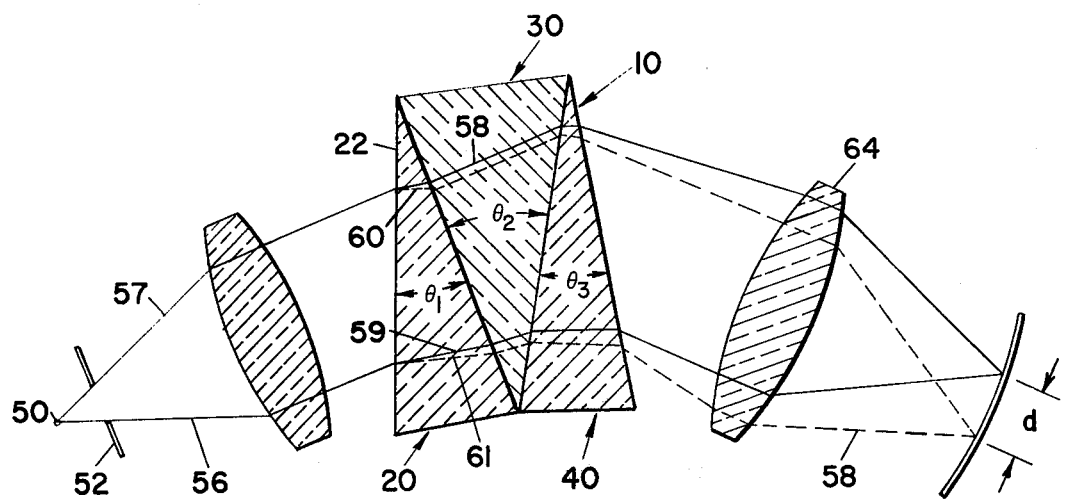

United States Patent [19]
Hall, Jr.

[11] 3,900,263
[45] Aug. 19, 1975

[54] METHOD FOR MINIMIZING DEVIATION IN OPTICAL DISPERSION SYSTEMS

[76] Inventor: Joseph F. Hall, Jr., 1052 La Limonar, Santa Ana, Calif. 92705

[22] Filed: Jan. 4, 1974

[21] Appl. No.: 430,847

[52] U.S. Cl. .................. 356/74; 350/168; 350/320; 356/99
[51] Int. Cl.² .......................................... G01J 3/12
[58] Field of Search ............... 356/74, 99, 100, 101; 350/168, 286, 320

[56] References Cited
UNITED STATES PATENTS
2,696,520    12/1954    Bradley............................... 350/168

*Primary Examiner*—Vincent P. McGraw
*Attorney, Agent, or Firm*—Grover A. Frater

[57] ABSTRACT

Light is disbursed such that its wave length components are displaced approximately as a linear function of wave length by subtracting deviation which is non-linear in one manner from deviation which is non-linear in another manner. By altering degree of deviation and by selecting the manner of non-linearity in deviation, a composite deviation results which when graphed against wave length appears as an undulation about a straight line of relatively high slope. The graph crosses the straight line at one point more than the number of non-linear deviation curves that are contained in composite graph when the composite is formed by alternate addition and subtraction of such deviation.

The method may be practiced by arranging a number of prisms in series so that deviation is alternately added and subtracted. Prism composition is changed to achieve different non-linear characteristics.

1 Claim, 3 Drawing Figures

METHOD FOR MINIMIZING DEVIATION IN OPTICAL DISPERSION SYSTEMS

This invention relates to improvements in apparatus and methods for separating a beam of light into its color or wave length components. That function is useful in a number of applications, and in many of those applications it is desirable that the degree of physical separation vary as a linear function of wave length.

It is to do that, to provide a method and an apparatus by which to separate beams of light into their wave length components such that separation between components is linear, that is one of the chief objects of the invention. The optical instrument, or the section of a larger instrument, the purpose of which is to separate a light wave into its wave length components, is called a spectroscope. Most spectroscopes include a prism and means for directing a sample beam of light from a source into the prism at one of its faces. Light passes through the prism and emerges from another of its faces. It emerges in a direction that differs from the direction of entry by an angle called "deviation angle." That angle is a function of the prism angle and the "index of refraction" of the prism. "Prism angle" is defined as the angle formed by the faces at which light enters and emerges from a prism.

The index of refraction is a constant determined by the composition of the prism material. The index of refraction for known transparent materials differs at different light wave lengths. Accordingly, if a light beam entering a prism is composed of components having different wave lengths, the prism will exhibit a different index of refraction with respect to those components, and each component will be bent a different degree. If the output of the prism is projected on a surface, light of one wave length will strike the surface at a different point than will light of a different wave length. The distance between the points at which those light components strike the surface is a measure of their wave length difference. In practice, the output position of a beam of known frequency is used as a reference position and the wave length of other components is determined by measuring the distance from the reference position to the position at which a light of unknown wave length strikes the surface.

When one draws a graph of deviation angle against wave length, the locus of points that describes the relationship is a curve. The rate of change in the deviation angle with wave length is greater at shorter wave lengths than it is at longer wave lengths. The fact that the relationship between deviation and wave length is non-linear is generally undesirable, and it is particularly undesirable in the case of a spectrometer because it adds to the difficulty with which such instruments are calibrated.

In some kinds of spectrographic instruments the dispersed light output is displayed on a scale which is graduated in wave length. In such a case, the scale must be especially curved if an attempt is made to make the scale linear when viewed from a read-out point. In other instruments, the prism is rotated until a selected component of the light beam emanates from the prism component in a pre-determined direction. In such cases the degree of prism rotation is a measure of component wave length, and wave length is calibrated in terms of rotation. The scale may be made linear by using special cams between the input mechanism for rotating the prism and the structure that accomplishes actual rotation. An alternative to the use of special cams and special shaping of read-out scales is to use a defraction grating in the spectrometer in lieu of the prism. Use of the grating effectively eliminates the problem of non-linearity in dispersion. However, the defraction grating instrument is inherently a narrow bandwidth device. Anomolous output indications occur when a beam includes components that are separated in frequency by more than an octave. Furthermore, the diffraction grating is only efficient at the blaze wave length and is quite inefficient at wavelengths significantly different from the blaze.

It is an object of this invention to provide a wide band spectrometer with the high efficiency characteristic of a prism in which the relationship between dispersion and wave length is nearly linear as in a diffraction grating, and without the problem of anomolous indications. That result is accomplished in the invention by employing a prism set, one part of which is made of a different material from that of another part. Non-linearity in the dispersion of one part of the prism set is made to cancel the non-linearity in another part of the prism set. It is non-linearity, rather than dispersion, that is cancelled. The materials are selected so that the resultant dispersion is relatively great. That result can be achieved, and the invention practiced, in a prism set using two or more prisms or optic pieces. Non-linearity can be cancelled by the prisms so that the dispersion experienced by a light wave passing through one prism is cancelled by the dispersion in the other. That technique is not employed in the invention because a large dispersion is required. Instead, the invention employs optic pieces having different rates of change of dispersion with wave length. They are arranged so that dispersion and non-linearity in one opposes the dispersion and non-linearity in another, but such that the cancellation of non-linear characteristics exceeds the cancellation of the dispersion.

Manufacturers of optics have known from an early time that the index of light refraction varies greatly as the composition of the optic material is changed. Thus, flint glass has long been known for its high index of refraction. On the other hand, crown glass is known for its low index of refraction. It is widely publicized and generally known how to make optic material with a desired intermediate index of refraction by altering the composition of the optic material. In that connection the curve of index of refraction plotted against wave length is known for many optic material composition formulas. Information on what ingredients, and what proportions of ingredients, will produce glass of a given refractive index, is well known and well publicized. A well known source of such information is the optical glass catalog published and distributed by Jenaer Glasswork Schott & Gen., Mainz, West Germany.

The relationship between index of refraction and wave length for such materials is described in a number of imperical equations. One of the more simple of these equations is called Cauchy's Equation. It expresses index of refraction as a function of inverse powers of wave length and a number of constants. Those constants are descriptive of characteristics of optical materials which are indicative of their composition. That kind of knowledge is useful in calibrating spectrographic instruments and in using opposing optic pieces to cancel dispersion as in the making of an achromatic lens systems.

However, as described above, mere cancellation of dispersion is not enough in this case. It is an object of the invention to provide a method and an apparatus by which to separate a beam of light into its wave length components such that the physical separation of the components is large and is substantially a linear function of wave length. It has been discovered that it is entirely possible to accomplish that objective. The invention arises out of the discovery that it can be done by combining three prisms so that deviation in one of them reduces the combined deviation in the other two. The rate of change of deviation with wave length must be different in the three prisms and they are arranged so that the one having the greatest rate of change of deviation with wave length subtracts from the deviation of the other two. It was discovered that the invention could be practiced with other than three prisms. Moreover, it can be demonstrated mathematically that the discovery is valid. Actually, the invention can be demonstrated, and its advantages realized, by using any number of prisms more than one. The mathematical verification that follows employs Cauchy's equation because of its simplicity and because of availability of data relating to the constants in the equation to glass composition formulas.

A very significant contribution of this invention is that the means of obtaining a linear relationship between wave length and deviation angle in a prism spectroscope is achieved by optical design of a multi-element prism rather than the usual complex mechanical cam linkage.

Let
$\delta$ = deviation
$\theta$ = prism angle
$n$ = index of refraction
$A$ and $B$ be constants in Cauchy's Equation.

Angular deviation can be expressed for small angles as follows:

(Equation 1)
$$\delta = (n-1)\theta$$

There are a number of approximate equations which relate index of refraction to wave length. One of them is Cauchy's Equation.

(Equation 2)
$$n = no + \frac{A}{\lambda 2} + \frac{B}{\lambda 4}$$

By substitution:
(Equation 3)
$$\delta = \left(no + \frac{A}{\lambda 2} + \frac{B}{\lambda 4} - 1\right)\theta$$

A locus of points described by Equation (3) will intersect a straight line in two places.

Differentiation of Equation (3) results in Equation (4):

(Equation 4)
$$\frac{d\delta}{d\lambda} = \frac{-2\theta A}{\lambda 3}$$

If two prisms are cemented together so that the beam traverses them in series and the deviation in one is subtracted from the other, then the combined deviation, $\delta T$ is given by:

(Equation 5)
$$\delta T = \delta_1 - \delta_2 = \left(n_1 + \frac{A_1}{\lambda 2} + \frac{B_1}{\lambda 4} - 1\right)\Theta_1 - \left(n_2 + \frac{A_2}{\lambda 2} + \frac{B_2}{\lambda 4} - 1\right)\Theta_2$$

An equation in this form will intersect a straight line at three points porvided that the constants $n_1$, $A_1$ and $B_1$ differ from the corresponding ones of constants $n_2$, $A_2$ and $B_2$.

If three prisms are employed the expression for total deviation becomes:

(Equation 6)
$$\delta T = \delta_1 - \delta_2 + \delta_3 = \left(n_1 + \frac{A_1}{\lambda 2} + \frac{B_1}{\lambda 4}\right)\Theta_1 - \left(n_2 + \frac{A_2}{\lambda 2} + \frac{B_2}{\lambda 2} - 1\right)\Theta_2 + \left(n_3 + \frac{A_3}{\lambda 2} + \frac{B_3}{\lambda 4} - 1\right)\Theta_3$$

This equation will intersect a straight line at four points. That is apparent because the differential of dispersion with respect to wave length is a fifth order expression:

(Equation 7)
$$\frac{d\delta T}{d\lambda} = C = -\left(\frac{2A_1}{\lambda 3} - \frac{4B_1}{\lambda 5}\right)\Theta_1 + \left(\frac{2A_2}{\lambda 3} + \frac{4B_2}{\lambda 5}\right)\Theta_2 - \left(\frac{2A}{\lambda 3} - \frac{4B_3}{\lambda 5}\right)\Theta_3$$

(Equation 8)
$$C\lambda^5 = 2A_1\lambda^2 - 4B_1 + 2A_2\lambda^2 + 4B_2 - 2A_3\lambda^2 - 4B_3$$
(Equation 9)
$$C\lambda^5 = 2(A_1\theta_1 - A_2\theta_2 + A_3\theta_3)\lambda^2 + 4(B_1\theta_1 - B_2\theta_2 + B_3\theta_3) = 0$$

The invention is not very apparent, even when understood, when only two prisms are used because nonlinearity increases as the slope of the straight line increases. Thus, the two effects are opposed and the price for greater resolution is greater non-linearity. However, as the number of prisms increases, the resultant curve of deviation with wave length approaches a linear relationship more rapidly than the average slope of the line decreases. The form of the equation indicates that the curve will intersect a straight line at a number of points one greater than the number of prisms. To limit the degree of deviation from the straight line at points between intersections, deviation in some prisms must be subtracted from the deviation in others.

The mathematical basis for the invention having been established, its practice can be optimized using computer techniques. Computations can be made by hand, but the computer approach is so far superior that manual computation does not warrant consideration. One computer technique involves establishing the range of the constants $n$, A & B in Cauchy's equation that can be achieved by adjustment of optical material composition. Information of that kind is available in published form. The combination of values that can be achieved is the permissible range of effective computation. Also, a set of straight lines of deviation against wave length are defined by writing their equations. These lines will differ from one another in slope and displacement, and they extend over a range of wave lengths consistant with the application assigned to the end product.

The computer is made to write the equation for total deviation over and over for each permissable combination of the constants in A and B, and for each physical arrangement of prism pieces. The term "physical arrangement" relates to the order in which prisms of a set are arranged to add to or subtract from total deviation.

Each time the equation of total deviation is thus written, it is solved simultaneously with each of the linear equations, both to verify the number of intersections and to define the amount of deviation of the dispersion graph from the line defined by the linear equation. That solution is selected which results in minimal separation and in which includes the linear equation with greatest slope.

Figure 2:
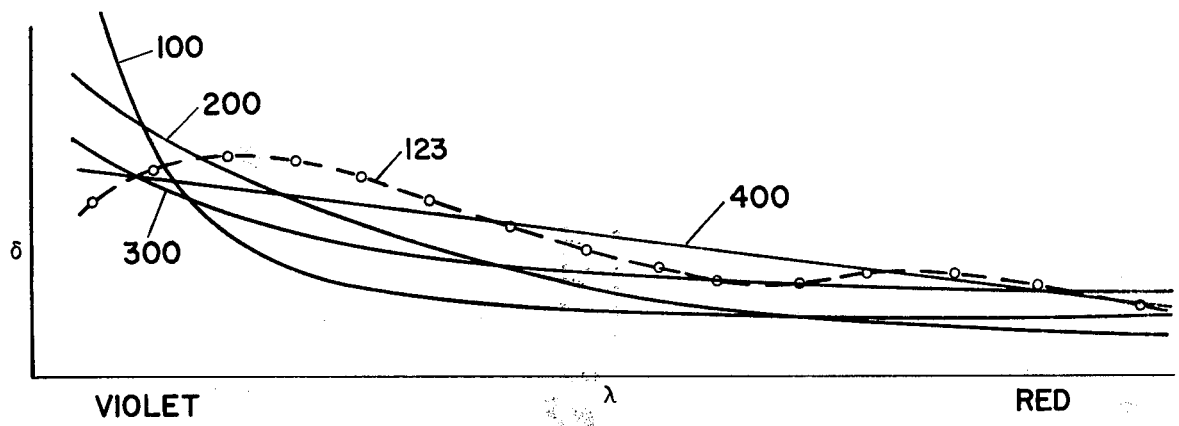
Figure 3:
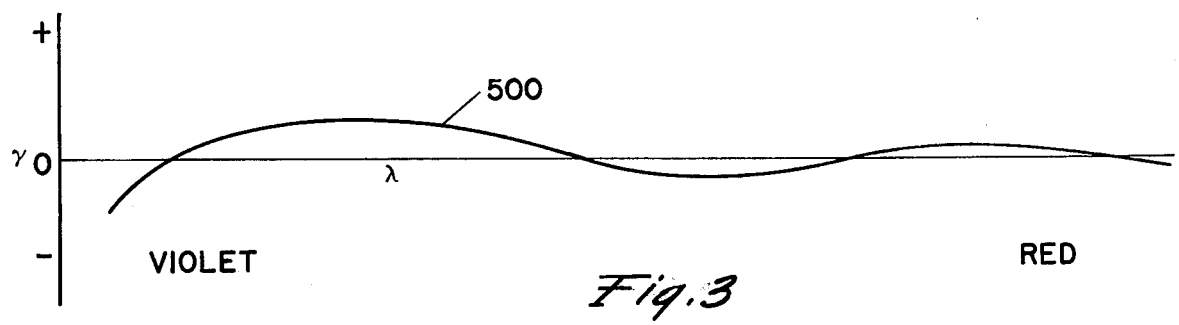

The physical arrangement of one prism set made according to the invention is illustrated in FIG. 1. The manner in which deviation varies with wave length in each of the optic pieces that form the composit prism and the total deviation at each wave length are graphed in FIG. 2. The degree in which the line of total deviation in FIG. 2 is separated from the straight line is shown in FIG. 3.

The prism set 10 in FIG. 1 includes three optical pieces, 20, 30 and 40, which are themselves prisms and which are cemented together so that the deviation of prism 30 is subtracted from the deviation of prisms 20 and 40. The prism angle for these three prism elements are designated $\theta_1$, $\theta_2$ and $\theta_3$. In each case, the angle exceeds 10°. The approximate deviation equation for a prism is considered to be accurate only for small angles less than 10°. In this case, the angles have been made larger so that deviation and dispersion are more easily depicted and understood.

Light from a point source 50 passes through the aperture of a screen 52 and impinges upon the surface of a collimating lens 54. The light beam is represented by a lower ray 56 and an upper ray 57, it being understood that the light beam consists of many rays between those extremes. The light beam including rays 57 and 56, enters the face 22 of prism 20 where rays 57 and 56 and any others are bent upwardly. Because prism 20 has the effect of causing a greater degree of deviation of lower wave length light than it does of higher wave length light, wave length components in each ray begin to separate. For the purpose of this explanation, it is assumed that rays 56 and 57 comprise two components, one a red light and the other a violet light. The number 58 indicates the red component of ray 57 and the number 59 indicates the red component of ray 56. The dotted line 60 represents the violet component of ray 57. Similarly, the dotted line 61 represents the violet component in ray 56. The three prisms have the property of bending a low wave length light more than they do light of higher wave length. Because of that, the components 58 and 60 and the components 59 and 61 begin to separate in the manner illustrated in the drawing.

The components separate in prisms 20 and 40 and they tend to come together in prism 30 because of the direction of entry of the beam into the several prisms. Upon leaving the prism set 10 the beam passes through a focusing lens 64 and its components are focused on a scale. The red rays 58 and 59 fall on a line on the scale at a distance d from the line on which the violet rays 60 and 61 fall on the scale.

FIG. 2 is a graph of deviation $\delta$ plotted against wave length $\lambda$ between red and violet for each of three component prisms and for a composite prism made of the three. The individual curves are designated 100, 200 and 300, respectively. The three component prisms whose deviation is described by these curves differ in composition. They differ primarily in the proportions of calcified flints, lead oxide and lime silicate which they contain. The prism whose curve is numbered 100 contains more flint glass than the others and the prism whose curve is numbered 300 contains more crown glass than the others.

Like the component prisms of FIG. 1, those which have curves shown in FIG. 2 are related so that the deviation in two of them is diminished by the deviation in the third. The deviation depicted by curve 100 is subtracted from the sum of the deviations depicted by curves 200 and 300. The result is curve 123. There are several straight lines that could be drawn through curve 123, such that they would intersect it at four places (one more than the number of component prisms). One of those straight lines has been drawn in FIG. 2, where it is numbered 400.

FIG. 3 is a graph of the amount, $\gamma$, by which curve 123 lies above or below curve 400 in FIG. 2. The curve 500 is not a straight line, but is much more nearly linear than any of curves 100, 200 or 300.

It will be apparent that the deviation in successive prisms need not be reversed. For example, prism 20 in FIG. 1 could be divided into two prisms by bisecting it along the mid-line through angle $\theta_1$. That would not alter the result. Consequently, for the purpose of definition, adjacent prisms that are not reversed are considered to be a single prism. Reversal of the component prisms is required in the invention.

Although I have shown and described certain specific embodiments of my invention, I am fully aware that many modifications thereof are possible. My invention, therefore, is not to be restricted except insofar as is necessitated by the prior art.

I claim:

1. The method of designing a prism set for dispersing light such that components differing in wave length are physically separated, which comprises the steps of:
    algebraically adding at least three equations, each of which expresses deviation in a prism and which can be reduced to the form:

$$\delta = \left( n_0 + \frac{A}{\lambda^2} + \frac{B}{\lambda^4} \right) \theta$$

such that together said equations express resultant deviation through three prisms arranged so that the sum of the deviation through two of them is diminished by deviation through the third to produce an expression for resultant deviation;

recording the known range of values of the terms $n_0$, A, and B that can be achieved in a single prism by selection of the materials from which a prism may be made;

computing values of $\theta$, $n_0$, A and B in each of the equations that form said expression that would cause said expression to describe a locus of points on a graph of deviation versus wave length that crosses a straight line at not less than four points;

constructing at least three prisms, each having a prism angle and composition corresponding to a respectively associated one of said three equations; and associating said three prisms such that light can pass through them in series such that deviation is added upon light passing through the first and third of said three prisms and is diminished upon said light passing through the second of said three prisms.

* * * * *